US006741897B1

(12) United States Patent
Lallemant

(10) Patent No.: US 6,741,897 B1
(45) Date of Patent: May 25, 2004

(54) TERMINAL FOR TAKING BETS

(75) Inventor: Jean-Francois Lallemant, Maison Laffitte (FR)

(73) Assignee: Sagem SA, Paris (FR)

( * ) Notice: Subject to any disclaimer, the term of this patent is extended or adjusted under 35 U.S.C. 154(b) by 42 days.

(21) Appl. No.: 09/254,443

(22) PCT Filed: Oct. 3, 1997

(86) PCT No.: PCT/FR97/01757

§ 371 (c)(1),
(2), (4) Date: Sep. 7, 1999

(87) PCT Pub. No.: WO98/15923

PCT Pub. Date: Apr. 16, 1998

(30) Foreign Application Priority Data

Oct. 4, 1996 (FR) ............................................ 96 12118

(51) Int. Cl.[7] ...................... G06F 155/00; G06F 17/00; G06F 19/00; A63F 13/00; A63F 3/24

(52) U.S. Cl. ............................ 700/93; 700/90; 700/91; 463/25; 273/148 R

(58) Field of Search ............................ 700/93, 90, 91, 700/92; 463/1, 16, 17, 25, 46, 47; 273/148 B, 148 R

(56) References Cited

U.S. PATENT DOCUMENTS

| | | | | | |
|---|---|---|---|---|---|
| 3,124,674 | A | * | 3/1964 | Edwards et al. | 235/61.1 |
| 3,665,494 | A | * | 5/1972 | Baumoel | 364/410 |
| 4,023,184 | A | * | 5/1977 | Stillman, Jr. | 347/208 |
| 4,220,992 | A | * | 9/1980 | Blood et al. | 364/410 |
| 4,323,770 | A | * | 4/1982 | Dieulot et al. | 463/25 |
| 4,339,798 | A | * | 7/1982 | Hedges et al. | 463/26 |
| 4,373,726 | A | * | 2/1983 | Churchill et al. | 463/19 |
| 4,587,411 | A | * | 5/1986 | Obstfelder et al. | 235/437 |
| 4,630,129 | A | * | 12/1986 | Hayashi et al. | 358/296 |
| 4,813,802 | A | * | 3/1989 | Gilham et al. | 400/74 |
| 4,875,174 | A | * | 10/1989 | Olodort et al. | 715/507 |
| 4,977,503 | A | * | 12/1990 | Rudnick et al. | 364/410 |
| 5,127,044 | A | * | 6/1992 | Bonito et al. | 379/88 |
| 5,153,826 | A | * | 10/1992 | Johnson | 364/410 |
| 5,173,850 | A | * | 12/1992 | Shimura et al. | 705/13 |
| 5,239,165 | A | * | 8/1993 | Novak | 235/375 |
| 5,412,188 | A | * | 5/1995 | Metz | 235/375 |
| 5,464,971 | A | * | 11/1995 | Sutcliffe et al. | 235/379 |
| 5,475,205 | A | * | 12/1995 | Behm et al. | 235/375 |
| 5,562,550 | A | * | 10/1996 | Chartrand | 473/131 |
| 5,621,200 | A | * | 4/1997 | Irwin et al. | 235/375 |
| 5,636,920 | A | * | 6/1997 | Shur et al. | 364/410 |
| 5,647,795 | A | * | 7/1997 | Stanton | 463/1 |
| 5,873,782 | A | * | 2/1999 | Hall | 463/25 |
| 5,999,808 | A | * | 12/1999 | LaDue | 455/412 |
| 6,041,266 | A | * | 3/2000 | Nickerson | 700/92 |

FOREIGN PATENT DOCUMENTS

| | | |
|---|---|---|
| EP | 0 115 027 | 8/1984 |
| EP | 0 240 203 | 10/1987 |
| EP | 0 331 352 | 9/1989 |
| GB | 2 262 635 A | 6/1993 |
| WO | WO 92/16914 | 10/1992 |
| WO | WO93/03454 | 2/1993 |

OTHER PUBLICATIONS

Patent Abstract of Japan vol. 18 No. 305 JP 06 062166 Miyazawa Kiyoto 4, Mar. 1994.

Patent Abstract of Japan vol. 010 No. 076 JP 60 214079 Fujitsu KK 26, Oct. 1985.

* cited by examiner

*Primary Examiner*—Teresa Walberg
*Assistant Examiner*—Binh-An D. Nguyen
(74) *Attorney, Agent, or Firm*—Greenberg Traurig LLP; Eugene C. Rzucidlo

(57) ABSTRACT

The terminal includes a unit for entering bets, a unit for printing information on a betting receipt, a unit for checking the validity of a receipt received, a unit for checking that the printed receipts conform with the information to be printed on them, and a unit for invalidating receipts, arranged to be activated under the command of the checking unit. The invention applies well to popular betting games.

5 Claims, 1 Drawing Sheet

TERMINAL FOR TAKING BETS

BACKGROUND OF THE INVENTION

The invention relates to popular games and more especially those which consist in taking bets, generally at retail betting outlets, on a horse race, a football match, a lotto draw and other events.

To record the players' bets, each retailer is provided with a game recording terminal linked to a distant central unit which manages the entire taking of bets made with all the terminals which form a game network.

In order to place a bet, the player, for instance at a horse race, ticks a game grid, indicating his forecast for the placing of the horses. The ticked grid is read by a game recording terminal and the central unit allocates an identification number to this record of a bet. The player's bet and his identification number are then printed by the terminal on a receipt given to the player.

In the case where a player's bet wins, he must present his receipt to one of the retailers of the game network. The validity of the receipt is then checked by the retailer's game recording terminal, linked to the central unit, before the winnings are paid to the player.

Such a check aims especially at avoiding paying winnings on the presentation of a forged receipt, but does not have any dissuasive effect aimed at stopping an attempt to defraud.

Besides, in spite of the good faith of the player, his receipt can bear false or illegible information, due to problems with the printer (electrical, mechanical or programming), with the printing paper (more often than not, thermal), or with transmission, in the game recording terminal which has printed the receipt.

In short, the security of the systems of prior art for recording games is not guaranteed.

SUMMARY OF THE INVENTION

The invention aims at making the game recording terminals more secure.

To this end, the subject matter of the invention is a game recording terminal comprising:

means for entering bets;

means for printing information on a betting receipt; and means for checking the validity of a receipt received;

characterised by the fact that the terminal comprises:

means for checking that the printed receipts conform with the information to be printed on them: and means for invalidating receipts, arranged to be activated under the command of the checking means.

It will observed that the invalidation means can be activated by the conformity checking means as well as by the means for checking the validity.

Thanks to the invention, a receipt for a winning bet is automatically invalidated, after validation, by the terminal. Besides, the terminal self-checks the information which it prints on each receipt in order to render invalid the erroneous receipts. The terminal of the invention thus contributes to further safeguarding the bet entries.

Advantageously, the means for checking the validity and the means for checking the conformity comprise common means of image analysis.

In a preferred embodiment of the invention, the invalidation means include printing means.

The invalidation of a receipt is thus carried out by simple marking of the word "invalid" for instance.

Advantageously, the printing means intended for printing the betting receipts and the printing means intended for invalidating the receipts are distinct.

Again, preferably, the means of entering bets comprise means of image analysis common to the checking means.

Thus, in this last case, the means of image analysis are designed to analyse, or read, not only the information carried by the receipts, but also that of the betting supports, such as the game grids for instance.

BRIEF DESCRIPTION OF THE DRAWINGS

The invention will be better understood with the aid of the following description of a preferred embodiment of the game recording terminal, referring to the single drawing enclosed which shows a functional block diagram of said embodiment.

DETAILED DESCRIPTION OF THE PREFERRED EMBODIMENTS

Figure 1:
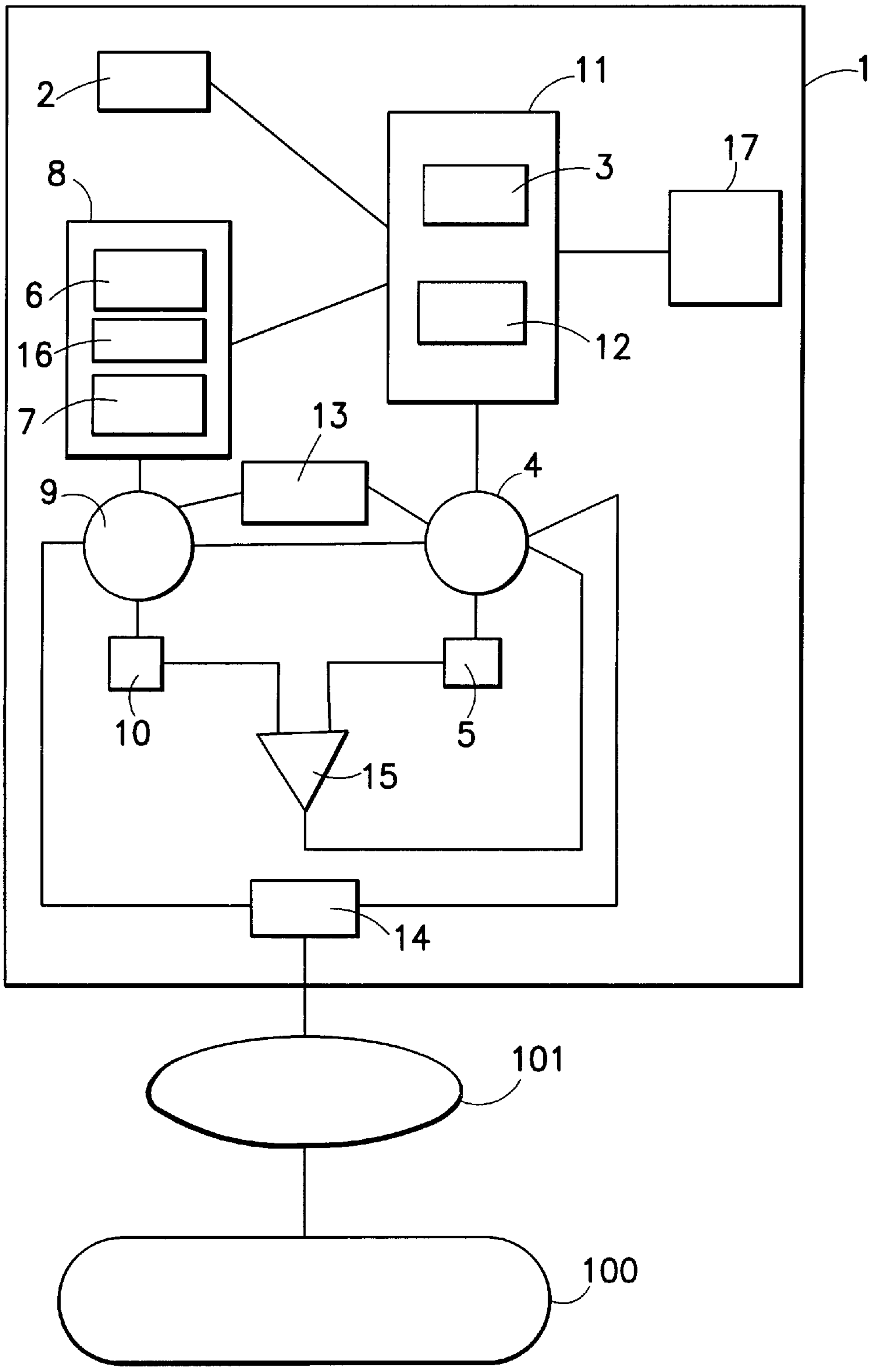

Game recording terminal 1, to equip a game retailer, is linked to a distant central unit 100, through the switched telecommunication network (STN) 101, a plurality of terminals of a game network being thus linked to the central unit 100.

The retailer can, with the aid of terminal 1:

enter the players' bets in order to transmit them to the central unit 100 and give betting receipts to the players, and check the validity of the winning betting receipts with the help of the central unit 100, before paying out the corresponding winnings to the players.

Terminal 1 comprises a manual entry 2 to introduce an information support into terminal 1.

By definition, the information support can be a game support on which a player's bet is entered, or a betting receipt.

Through a support driving mechanism, entry 2 communicates with an image analysis device 3 comprising a captor image sensor, intended here for reading information from an information support.

Image analysis device 3 also communicates with the output of a receipt printing unit 8 comprising a write head 7, thermal here, a roll 6 of tape paper infeed, fitted on the output shaft of a rotary driving motor and a paper cutter 16 to cut the receipts, associated with a paper driving device. The printing unit 8 is connected to a unit 9 for commanding printing, in the case in point a microprocessor linked to a working storage unit 10.

A printing head 12 for invalidation is placed behind the image analysis device 3 following the driving direction of the information supports, the whole forming a checking and invalidation unit 11 intended for checking the validity or the conformity of the receipts, then for invalidating some of them, as will be explained later.

The checking unit 11 is connected to a microprocessor 4 commanding the analysis, linked to a working storage unit 5.

In output, checking unit 11 is linked to an exit 17 for ejecting an information support.

Terminal 1 comprises also a man-machine interface 13 linked to two command microprocessors 4 and 9 and comprising a validity indicator light and an invalidity indicator light.

Both microprocessors 4 and 9, connected to each other, are also connected to a transmitter-receiver unit 14 linked here by a wire link to the central unit 100, via the switched telecommunication network (STN) 101.

Finally, the two working storage units 5 and 10 are respectively connected to two inputs of a comparator 15 linked in output to microprocessor 4 commanding analysis.

After the structural description of the game recording terminal 1, its operation will now be described.

To enter a player's bet, his game support is manually introduced into the game recording terminal 1 via entry 2. After automatic driving of the game support from entry 2 to image analysis device 3 under the command of microprocessor 4, the support information, namely the player's bet, is read by the captor image sensor, then recorded in the working storage unit 5 and also transmitted to the distant central unit 100 by means of the transmitter-receiver 14, via the STN network 101. The game support is afterwards ejected from terminal 1 via the ejection exit 17.

The central unit 100 records the transmitted and received bet in a database of all the bets made in the plurality of the terminals of the game network. Moreover, central unit 100 allocates to the entry of a player's bet an identification number transmitted in return to terminal 1, then recorded, after receipt by unit 14, in memory 5 which already contains the player's bet.

Under the command of analysis microprocessor 4, the contents of memory 5 are transferred to memory 10 and the microprocessor 9 commands printing unit 8 to print the bet and the number which identifies the player on a receipt. The roll of paper 6 is then rotary driven in order to feed the activated printing head 7.

After printing by head 7, the receipt is cut (16) and driven to the checking and invalidation unit 11.

The bet and identification number printed on the receipt are read by the captor image sensor of the analysis device 3, and the information read is stored in memory 5 initially empty.

After printing and analysis of the printed information, the respective contents of the two memories 5 and 10 are compared with one another by means of the comparator 15.

If there is similarity, the printed information on the receipt being in accordance with the information printed on it (bet and identification number), the receipt is ejected via exit 17, under the command of microprocessor 4.

In the case of non-conformity of the receipt, due for instance to a printing error, microprocessor 4 activates the invalidation head 12 in order to print "invalid" on the receipt which is then ejected via exit 17.

In order to check the validity of a receipt carrying a winning bet, the receipt, manually introduced into terminal 1 via entry 2, is analysed by the image analysis unit 3. The identification number and the bet printed on the receipt are read and transmitted to the central unit 100 by the transmitter-receiver unit 14, via the STN network 101.

Central unit 100 checks the validity of the receipt and informs terminal 1 of its validity or its non-validity, transmitting specific information received by unit 14 and transmitted to microprocessor 4.

In the case of validity of the receipt, the validity indicator on the man-machine interface 13 lights up, and the invalidation head 12 is activated in order to print "invalid" on the receipt under command from microprocessor 4. The invalidated receipt, thus unable to be the object of new later validation is ejected from terminal 1 via exit 17.

In the case of invalidity, the receipt is directly ejected from terminal 1 and the invalidity indicator lights up.

A different embodiment of the game recording terminal has only a single printing head which is intended both for printing and invalidating the receipts. The terminal comprises in this case a reverse travel system in order to reverse the receipts, after printing and analysis and before cutting and ejection, towards the printing head for invalidation.

I claim:

1. A game recording terminal (1) comprising:

means (2, 3) for entering bets;

means (7) for printing information on a betting receipt; and means (3, 4, 14) for checking validity of a receipt introduced into the terminal via said means (2, 3) for entering bets;

wherein terminal (1) comprises means (3, 15, 9, 4) for checking that the printed receipts, after having been printed by said means for printing information on a betting receipt, conform with the information to be printed on them; and means (12) for invalidating receipts, arranged to be activated by the means for checking the conformity of the receipts as well as by the means for checking the validity of the receipts.

2. Terminal according to claim 1, in which the means (3, 4, 14) for checking the validity and the means (3, 15, 9, 4) for checking the conformity comprise common means (3) of image analysis.

3. Terminal according to one of claims 1 and 2, in which the invalidation means (12) comprises printing means.

4. Terminal according to claim 3, in which the printing means (7) intended for printing the betting receipts and the printing means (12) intended for invalidating the receipts are distinct.

5. Terminal according to one of claims 2 to 4, in which the means (2, 3) for entering bets comprises means (3) of image analysis common to the checking means (3, 4, 14, 15, 9).

* * * * *